United States Patent
Probst et al.

(10) Patent No.: US 12,546,425 B2
(45) Date of Patent: Feb. 10, 2026

(54) STABILIZER ELEMENT FOR A PIPE CONNECTION

(71) Applicant: FRAMATOME GmbH, Erlangen (DE)

(72) Inventors: Christof Probst, Nuremberg (DE);
Erhard Müller, Pretzfeld (DE);
Konrad Meier-Hynek, Herzogenaurach (DE)

(73) Assignee: FRAMATOME GmbH, Erlangen (DE)

( * ) Notice: Subject to any disclaimer, the term of this patent is extended or adjusted under 35 U.S.C. 154(b) by 998 days.

(21) Appl. No.: 17/421,372

(22) PCT Filed: Jan. 8, 2020

(86) PCT No.: PCT/EP2020/050248
§ 371 (c)(1),
(2) Date: Jul. 7, 2021

(87) PCT Pub. No.: WO2020/144198
PCT Pub. Date: Jul. 16, 2020

(65) Prior Publication Data
US 2022/0065375 A1 Mar. 3, 2022

(30) Foreign Application Priority Data

Jan. 11, 2019 (DE) .......................... 102019100627.9

(51) Int. Cl.
*F16L 37/133* (2006.01)
*F16L 37/12* (2006.01)
(Continued)

(52) U.S. Cl.
CPC ........... *F16L 37/133* (2013.01); *F16L 37/123* (2013.01); *F16L 57/06* (2013.01); *G21C 13/036* (2013.01); *G21C 17/10* (2013.01)

(58) Field of Classification Search
CPC ........ F16L 37/123; F16L 37/133; F16L 57/06
(Continued)

(56) References Cited

U.S. PATENT DOCUMENTS

| 3,414,299 A | 12/1968 | Homer |
| 4,029,345 A | 6/1977 | Romanelli |

(Continued)

FOREIGN PATENT DOCUMENTS

| CH | 381034 A | 8/1964 |
| DE | 2521930 A1 | 4/1976 |

(Continued)

OTHER PUBLICATIONS

English translation of ITUB20154813A1 (Year: 2016).*
Corresponding Search Report and Written Opinion for PCT/EP2020/050248.

*Primary Examiner* — Zachary T Dragicevich
*Assistant Examiner* — Fannie Kee
(74) *Attorney, Agent, or Firm* — Davidson Kappel LLC

(57) ABSTRACT

For stabilizing a pipe connection, in which a first pipe (10) is inserted into a second pipe (12) that has an insertion funnel (20), a stabilizer element (22) has a clamping ring (24) with several tensioners (48) distributed over its circumference, which in the final assembly position engage in an intermediate space between the first pipe (10) and the insertion funnel (20), and tense the first pipe (10) and the second pipe (12) against each other. The clamping ring (24) is composed of several mutually connectable ring segments, in particular of two half shells (34).

19 Claims, 6 Drawing Sheets

(51) Int. Cl.
*F16L 57/06* (2006.01)
*G21C 13/036* (2006.01)
*G21C 17/10* (2006.01)

(58) Field of Classification Search
USPC .................................................. 285/373, 419
See application file for complete search history.

(56) References Cited

U.S. PATENT DOCUMENTS

| | | | | |
|---|---|---|---|---|
| 4,092,036 | A * | 5/1978 | Sato | F16L 37/133 |
| | | | | 285/321 |
| 4,408,788 | A * | 10/1983 | Beukema | F16L 37/133 |
| | | | | 285/112 |
| 4,417,755 | A * | 11/1983 | Gittleman | F16L 37/133 |
| | | | | 285/423 |
| 4,471,979 | A * | 9/1984 | Gibb | F16L 37/133 |
| | | | | 285/411 |
| 4,568,112 | A * | 2/1986 | Bradley, Jr. | F16L 37/133 |
| | | | | 285/368 |
| 4,779,900 | A * | 10/1988 | Shumard | F16L 37/133 |
| | | | | 285/364 |
| 6,581,907 | B1 | 6/2003 | Kuwabara et al. | |
| 2003/0183274 | A1 | 10/2003 | Zikeli et al. | |
| 2004/0227347 | A1 * | 11/2004 | Fundin | F16L 37/133 |
| | | | | 285/419 |
| 2004/0232697 | A1 | 11/2004 | Tomita | |
| 2012/0025524 | A1 * | 2/2012 | Krausz | F16L 37/133 |
| | | | | 285/420 |
| 2017/0198848 | A1 * | 7/2017 | Deore | F16L 37/133 |
| 2018/0306361 | A1 * | 10/2018 | Furcoiu | F16L 37/133 |

FOREIGN PATENT DOCUMENTS

| | | | |
|---|---|---|---|
| DE | 3631026 A1 | 4/1988 | |
| DE | 3827662 A1 * | 2/1990 | ............ F16L 37/133 |
| DE | 10034337 B4 | 1/2002 | |
| DE | 102004025067 B4 | 5/2008 | |
| EP | 2366934 B1 * | 8/2013 | ............ F16L 19/086 |
| GB | 515549 A | 12/1939 | |
| IT | UB20154813 A1 * | 10/2015 | ............ F16L 37/133 |
| WO | WO0188419 A1 | 11/2001 | |
| WO | WO2014079974 A1 | 5/2014 | |

* cited by examiner

STABILIZER ELEMENT FOR A PIPE CONNECTION

The present disclosure relates to a stabilizer element for a pipe connection, in which a first pipe is inserted into a second pipe that has an insertion funnel. It further relates to a pipe connection with such a stabilizer element and a process for stabilizing a pipe connection, particularly with a core flow measurement housing tube in a nuclear power plant.

BACKGROUND

In a nuclear power plant, within the reactor pressure vessel there is usually a core flow measurement housing tube consisting of at least two individual pipes that are inserted into one another in a connection area with minor radial clearance. To ease insertion of one pipe end into the other pipe end during installation, the external pipe end has an insertion funnel.

Because reactor coolant flows against the core flow measurement housing tube during reactor operation, the radial clearance of the two pipes can cause undesirable vibration wear (fretting), which over an extended time can cause secondary damage, especially to a measuring probe enclosed by the core flow measurement housing tube.

An object of the present disclosure is to prevent or at least reduce this wear, and for the solution concept to be usable for other pipe connections outside the aforementioned technical area. In particular, retrofitting of existing pipe connections should be possible without having to disassemble them.

A stabilizer element for a pipe connection is provided, in which a first pipe is inserted into a second pipe that has an insertion funnel. The stabilizer element has a clamping ring with several tensioners distributed around its circumference, which in the final assembly position engage in an intermediate space between the first pipe and the insertion funnel and align the first and second pipe along a common axis and tense them against one another, wherein the clamping ring is composed of several mutually connectable ring segments, in particular of two half shells.

The present disclosure is based on the consideration that it would be possible to press both pipes hydraulically in the connection area. However, this would result in strain hardening, which is impermissible in the nuclear environment under today's safety standards. Instead, the present disclosure involves an easily retrofittable clamping solution that enables long-term stabilization of flow-animated pipe connections.

Here it is advantageous if adjacent ring segments of the clamping ring have mutually complementary projections and/or recesses on their connecting surfaces to enable self-centering assembly. Expediently, locking of neighboring ring segments of the clamping ring is provided using spring-loaded locking pins.

In one advantageous variant, the clamping ring has several snapping elements distributed over its circumference, which engage in the associated snap notches in the insertion funnel at final assembly position. If they are not already present, such snap notches can be introduced in a preparatory step by boring into the insertion funnel before installation of the stabilizer element.

In an alternative variant, the stabilizer element also has a circular attachment that, in the final assembly position, is supported against the second pipe and the insertion funnel, and at least partly overlaps the clamping ring, where the attachment is composed of several mutually connectable ring segments, in particular of two half shells. This variant allows the clamping ring to be fastened to the attachment. For this, the clamping ring preferentially has several snapping elements distributed over its circumference, which engage in the associated snap notches in the attachment at final assembly position. The snap notches can in particular be designed as a circumferential ring groove in the attachment.

As with the clamping ring, it is advantageous for neighboring ring segments of the attachment to have on their connection surfaces mutually complementary projections and/or recesses that allow self-centering assembly. Here also, locking of neighboring ring segments of the attachment is preferentially provided using spring-loaded locking pins.

The respective snapping element is preferentially designed as a flexure bearing, and the respective tensioner is preferentially designed to be at least partially wedge shaped.

As already mentioned, one preferential field of application is a nuclear power plant with a reactor pressure vessel and with a core flow measurement housing tube located in the reactor pressure vessel, which consists of at least two pipes that are connected to each other by a pipe connection of the type described and are protected from vibration wear by the stabilizer element according to the present disclosure. However, the present disclosure has general applicability to all pipe connections in which a first pipe is inserted into a second pipe that has an insertion funnel.

If the insertion funnel is not present ahead of time, it can be retrofitted before installation of the stabilizer element. For this, for example, a wedge-shaped or otherwise formed pipe collar can be used to serve as a counter-bearing for the clamping ring's tensioner. A function or intended purpose as an insertion aid is not absolutely necessary here.

A process is also provided for stabilizing a pipe connection in which a first pipe is inserted into a second pipe that has an insertion funnel that has a stabilizer element of the type described, in which separate ring segments are placed around the first pipe and then connected with each other to a closed clamping ring, such as to a circular attachment, and in which the clamping ring is then shifted in the axial direction into a clamping seat in the interim space between the first pipe and the insertion funnel.

In this case, it is advantageous if snapping elements attached to the clamping ring snap in upon sliding the clamping ring into the clamping seat in associated snap notches in the insertion funnel or in an attachment overlapping the insertion funnel, by which the clamping ring is fixed in the clamping seat.

BRIEF SUMMARY OF THE DRAWINGS

Several execution examples of the present disclosure are explained below with reference to the attached drawings.

The following are shown.

DETAILED DESCRIPTION

Identical or identically functioning parts are provided with the same reference signs in all figures.

Position designations, such as "top" or "bottom" and corresponding direction designations like "vertical" or "horizontal" are for easier intelligibility of the figure description but do not imply limitation to the assembly position drawn there.

Figure 1:
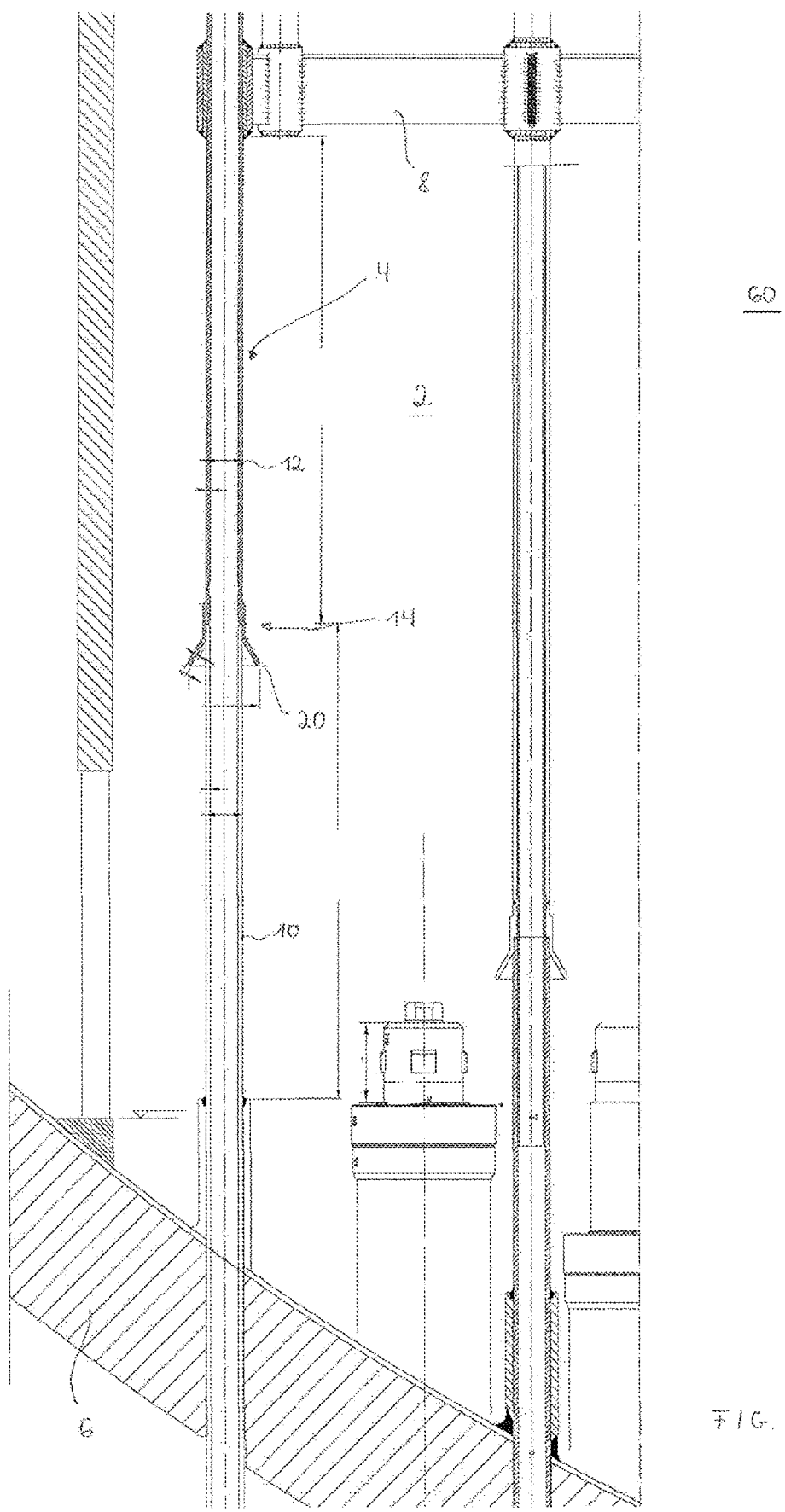
FIG. 1 a longitudinal section of a reactor pressure vessel of a nuclear power plant with a core flow measurement housing tube located within, which consists of two pipes connected to each other in a plug-in connector area, FIG. 2 a longitudinal section through the plug-in connector area according to FIG. 1, where the plug-in connector is protected from vibration wear by a stabilizer element, FIG. 3 individual components of the stabilizer element according to FIG. 2 before assembly, FIG. 4 a perspective view of the pipe connection with the stabilizer element installed, FIG. 5 a pipe connection with an alternative variant of a stabilizer element in a perspective view during the assembly phase, FIG. 6 a lateral top view pertaining to FIG. 5 in three different stages during assembly, FIG. 7 a cutaway representation corresponding to FIG. 6, FIG. 8 a clamping ring of the stabilizer element according to FIG. 5 before assembly, in perspective view, and FIG. 9 the clamping ring according to FIG. 8 after assembly.

FIG. 1 shows a detail of a longitudinal section through a reactor pressure vessel 2 of a nuclear power plant 60. In the reactor pressure vessel 2, several "core flow measurement housing tubes" (CFMHT) 4 are located, which, depending on the type of guide pipe, take up an instrumentation lance for measuring the neutron flow in the core. The vertically aligned CFMHT 4 in the execution example is guided pressure- and media-tight in a lower area through the vessel wall 6 of the reactor pressure vessel 2 and is supported in an upper area by associated holding elements 8 that together form what is called a CFMHT support band.

Each CFMHT 4 comprises two originally separate pipes 10 and 12, which, in the final assembled state, are loosely connected to the inserted into one another with minor radial play on the connecting section (snug fit). Specifically, in the execution example, the lower pipe 10 is inserted at its upper end into the lower end of the upper pipe 12. In the plug-in connector area 14 thus designed, the pipe ends overlap concentrically, leaving a small circumferential radial gap 16. This can be recognized easily in the enlarged detail representation in FIG. 2. For this purpose, the internal diameter of the upper pipe 12 in the plug-in connector area 14 is somewhat enlarged versus the nominal value in the rest of pipe 12, such that the wall of the upper pipe in this area is pulled somewhat outward and/or the wall thickness in this area is somewhat decreased. The stage 18 formed by this in the internal wall of the upper pipe 12 works as an axial limit stop for pipe 10 inserted from below. Based on the nesting in this area, it can also be said that one pipe end lies inside and the other pipe end lies outside.

To ease insertion of the lower pipe 10 into the upper pipe 12 during assembly, furthermore, an oblique outwardly protruding insertion funnel 20 (funnel, for short) is formed or attached to the lower end of the upper pipe 12.

During reactor operation, reactor coolant flows to the plug-in connector of the CFMHT 4, which causes vibration. Due to the radial clearance of the plug-in connector, this area experiences vibration wear (fretting), which over an extended time can cause damage to the pipe connection and to the measuring probe enclosed by the CFMHT 4.

To reduce or completely prevent this wear, a stabilizer element 22 is provided according to the present disclosure, which fastens both pipes 10 and 12 in their common axis A in the area of the plug-in connector.

Figure 2:
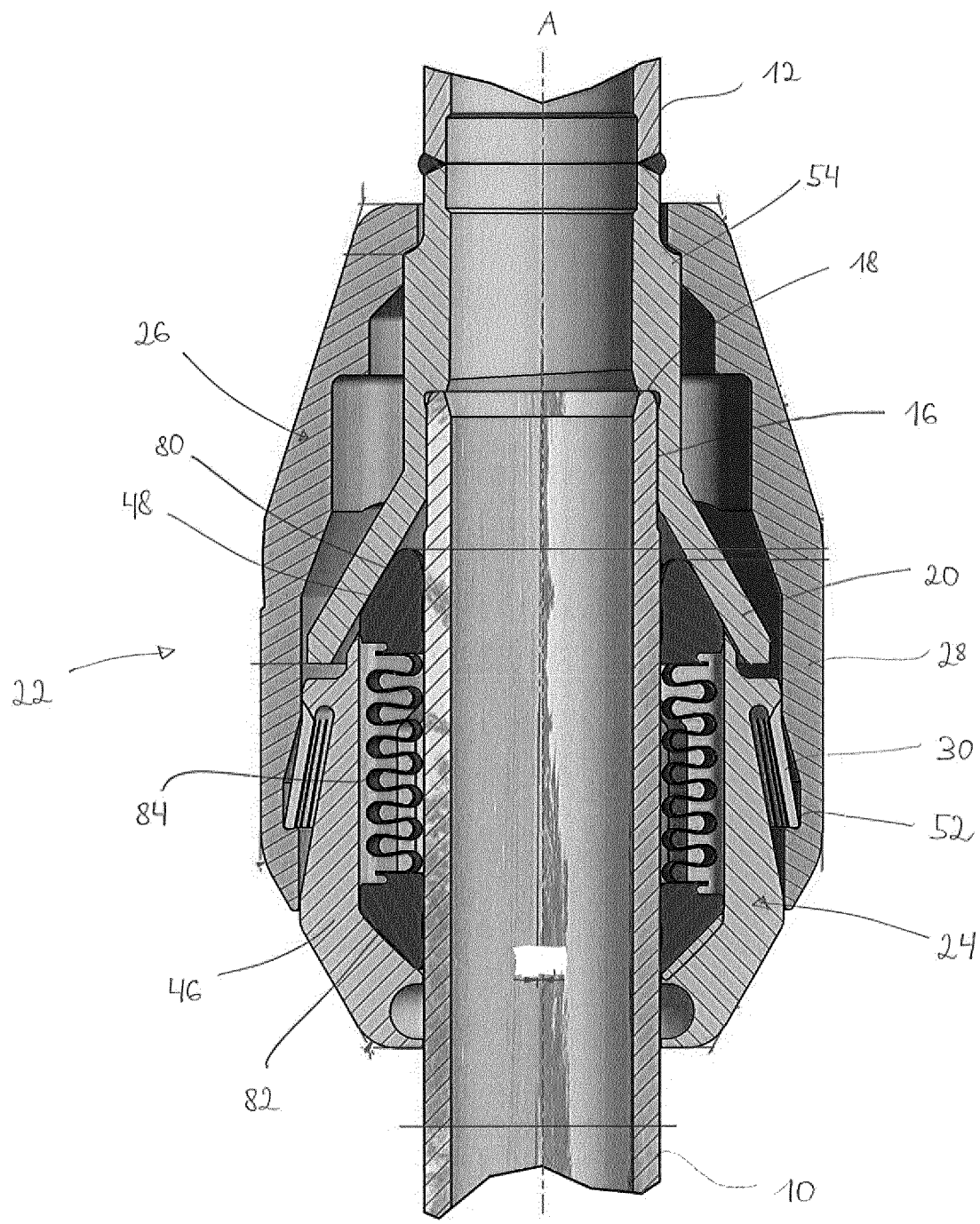
Figure 3:
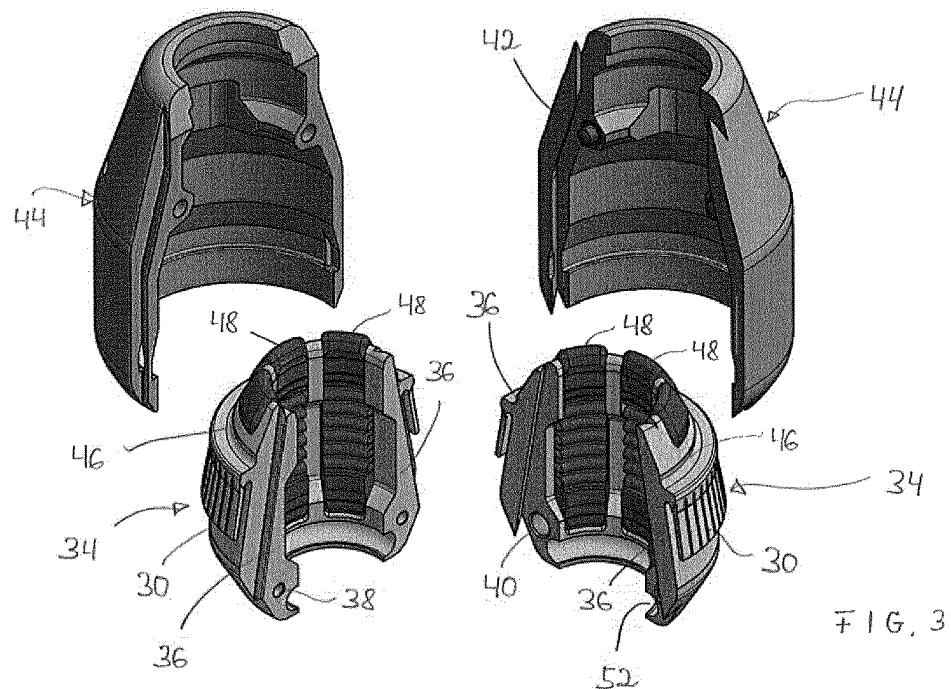
Figure 4:
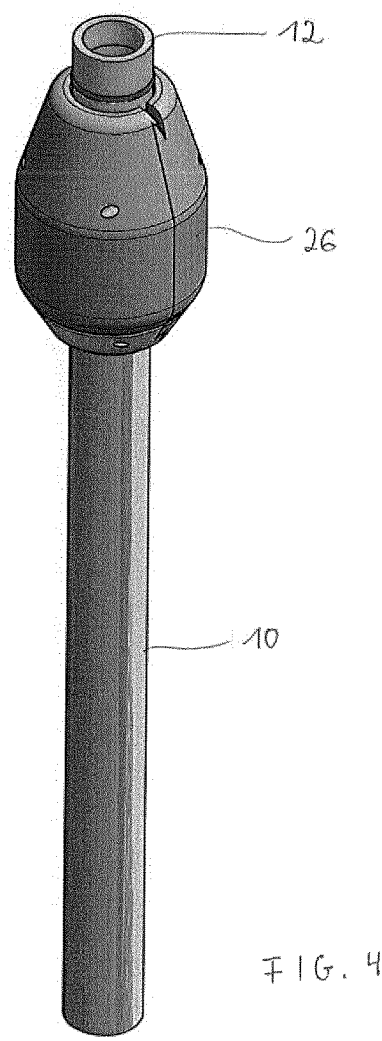

In a first variant according to FIGS. 2 to 4, the stabilizer element 22 consists of two main assemblies. In one of them, the stabilizer element 22 includes a pressure or clamping ring 24, which in the assembled state grips around the lower pipe 10, thereby engaging in the space between the insertion funnel 20 and the lower pipe 10 when a clamp fit is formed. This clamps the two pipes 10 and 12 against each other and fastens them in their common axis A. In the other case, the stabilizer element 22 is made up of a circular attachment 26 that grips around and supports the upper pipe 12 in the final assembled state. In this state, the jacket 28 of the attachment 26 extends over the insertion funnel 20 and at least partly over the clamping ring 24. In the final assembled state, snapping elements 30 located on the clamping ring 24 and protruding laterally in associated latch recesses or detent bearings in the jacket 28 of the attachment 26, by which both assemblies are durably connected to each other and are secured against axial shifting. In this way, attachment 26 forms a snap coupling that serves as an interlocking counter-bearing for the clamping ring 24.

To allow later installation of the stabilizer element 22 to a CFMHT 4, without having to loosen the existing connection of the two pipes 10 and 12, the clamping ring 24 consists of several ring-segmented partial shells, preferentially two half shells 34 according to FIG. 3, which can be fitted to a closed ring. For this, both half shells 34 have two abutting faces 36, preferentially with wedge-shaped protrusions or recesses that are designed to complement the protrusions or recesses of the other connecting piece. This embodiment is also called a dovetail guide. It secures the two half shells 34 against shifting relative to one another after assembly. At least one spring-loaded connecting or locking pin 38 protruding from the end face 36 of the one half shell 34 engages in an associated recess 40 in the abutting face 36 of the other half shell 34 during assembly and thereby causes locking. Preferentially, for each pair of abutting faces 36 connected to one another, at least one such locking device is provided. A generalization of the design principle to more than two partial shells can immediately be conceived.

The designs above apply exactly the same to an attachment 26 acting as a snap coupling, which preferentially is also made up of two half shells 44 lockable with locking pins 42.

As is visible in FIGS. 2 and 3, the half shell 34 of the clamping ring 24 has a predominantly rigid base body 46, in which—distributed over the circumference—one or more upward protruding flexing tensioners 48 are used. In the final assembled state, according to FIG. 2, the two base bodies 46 of the assembled clamping ring 24 are supported with the clamp fit on the lower pipe 10. The tensioners 48 grip into the interim space between the insertion funnel 20 and the lower pipe 10 and tense these components against each other, which suppresses the radial clearance previously present.

As shown here, each tensioner 48 can have a wedge-shaped upper part 80 and a wedge-shaped lower part 82, where the lower part 82 is supported on the base body 46. Here, the upper part 80 and the lower part 82 are connected together by a corrugated or accordion-shaped middle part 84, which takes over the function of a pressure spring and in the final assembled state presses the upper part 48 upward toward the insertion funnel 20.

Furthermore, each base body 46 of the clamping ring 24 has one or more laterally protruding snapping elements 30, preferentially in the form of radially arranged hook-shaped flexure bearings. Flexure bearing is a designation for an area of a component that allows relative movement between two rigid body areas through bending. A joint's function is achieved through an area of reduced bending stiffness relative to two adjacent areas with higher bending stiffness, such as through reduced thickness in the bending area. The snapping elements 30 can be molded onto the base body 46, for example.

The detent bearings of the attachment 26 associated with the snapping elements 30 of the clamping ring 24 can, according to FIG. 2, be designed as a circumferential ring groove 52 inside the jacket 28. In this regard, various modifications are possible, such as in the form of latch recesses penetrating the jacket 28, or similar.

The attachment 26 is preferentially designed such that it lies against the upper end with a clamp fit on the upper pipe 12. According to FIG. 2, it is supported against the circumferential shoulder 54 of the pipe 12 above the insertion funnel 20. This shoulder 54 acts as a limit stop if the attachment 26 is slid downward during assembly. It is also conceivable to support the attachment 26 directly on the insertion funnel 20. As already mentioned, the circular jacket 28 of the attachment 26 downwardly overlaps the insertion funnel 20 and at least partially the clamping ring 24 and thus preferentially forms a streamlined hood around the connection area of both pipes 10 and 12.

During assembly, the two half shells 34 of the clamping ring 24 are inserted at the corresponding connector or pipe end under the insertion funnel 20 and connected vertically by the dovetail guide to a support component. The two half shells 44 of the attachment 26 operating as a snap coupling are also connected above the insertion funnel 20 by the wedge-shaped dovetail guide to a support component. Both assemblies are respectively connected to each other form-fitting and inseparably upon axial (here vertical) displacement by the integrated locking device operating in the circumferential direction (here horizontally). This secures both assemblies against independent or unintentional loosening.

When the two assemblies are slid together, the clamping ring 24 is pressed vertically upward into the insertion funnel 20. At the same time, the flexible wedge-shaped tensioner 48 builds stabilization force, which aligns and fastens both pipe ends in their common axis A without play. Through this vertical stroke, the two hook-shaped snapping elements 30 of the clamping ring 24 simultaneously snap form-fitting into their respective snapping recesses or into the ring groove 52 of the snap coupling, thus keeping the stabilization force permanently and inextricably upright. The assembled state is shown in perspective in FIG. 4.

Figure 5:
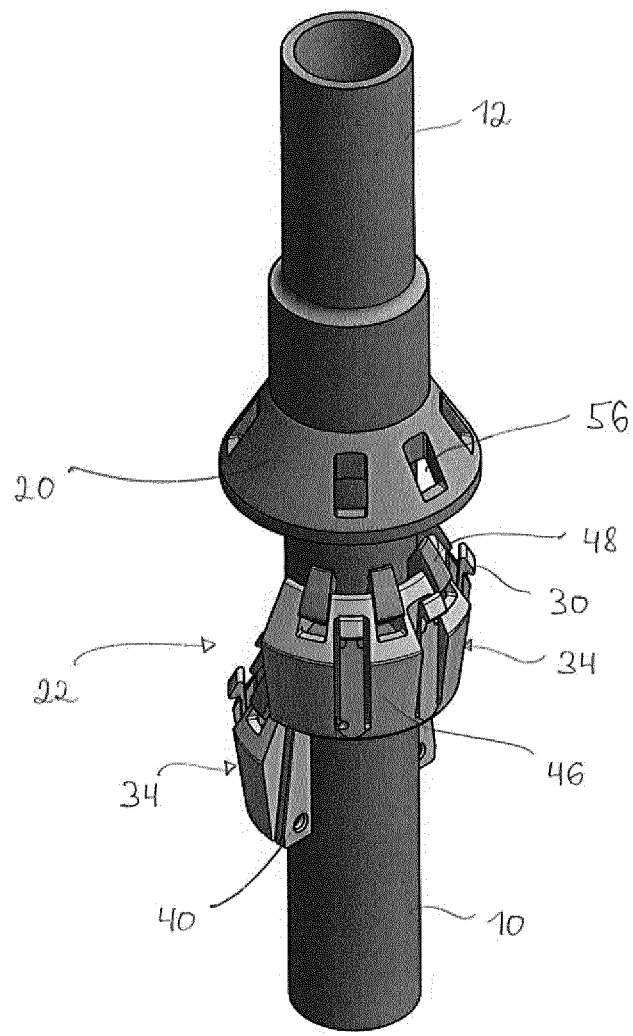
Figure 6:
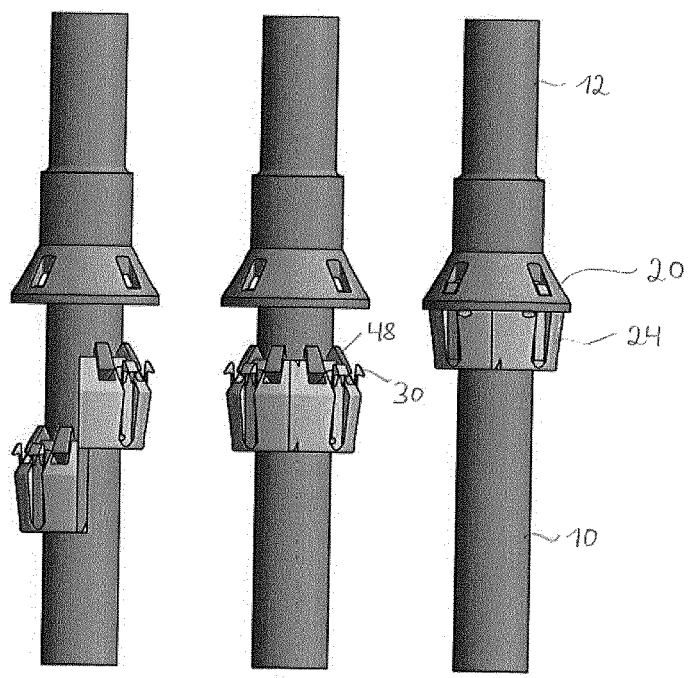
Figure 7:
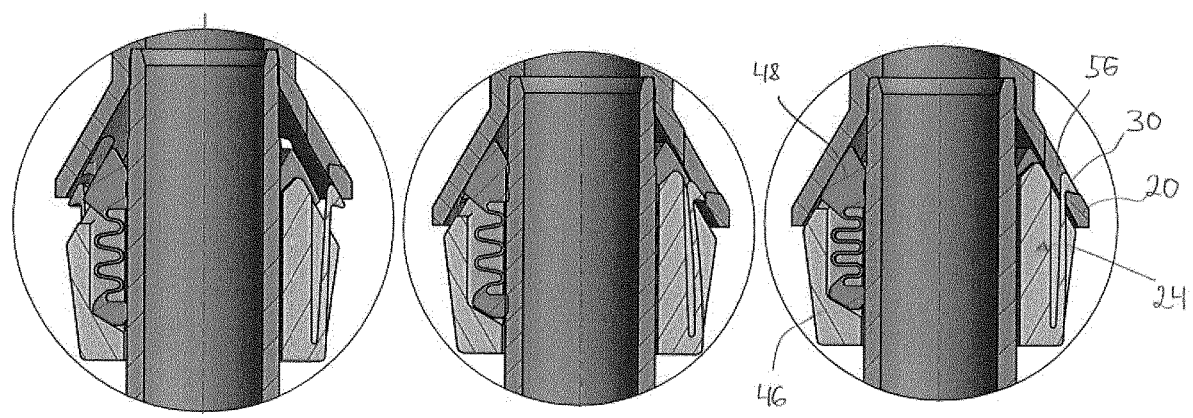
Figure 8:
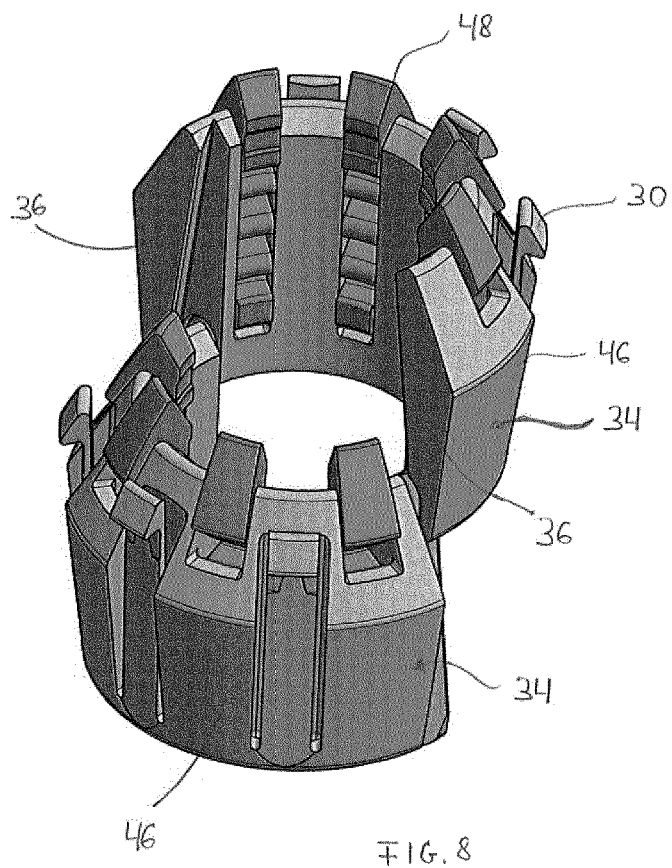
Figure 9:
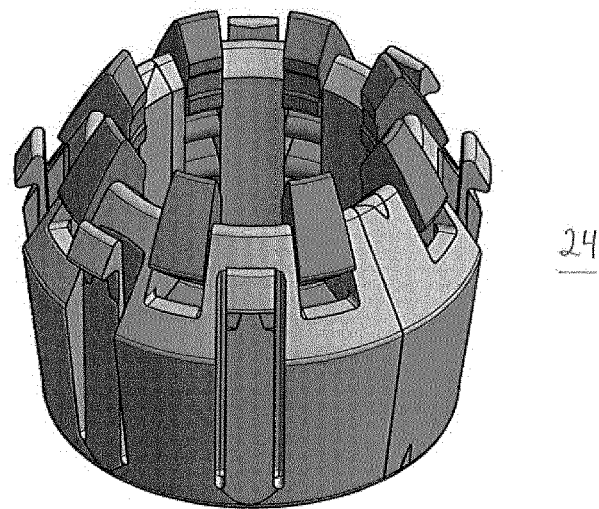

FIGS. 5 to 7 shows a further variant of the stabilizer element 22. The significant difference from the variant described above is that here the attachment 26 is not used. Instead, in the final assembled state, the snapping elements 30 of the clamping ring 24 grip into the latch recesses 56, which have been introduced earlier directly into the insertion funnel 20—such as by drilling. Thus, here the insertion funnel 20 itself operates as a snap coupling that, after formation of the snap connection fastens the clamping ring 2 in the axial direction. The shape of the snap hooks is adapted as in the detail. Otherwise, the structure of the clamping ring 24 is largely the same as the variant described above.

As already mentioned, the stabilizer element 22 according to the present disclosure can be retrofitted to an existing pipe connection without taking the connection apart. Assembly can be done with simple movement sequences, because the individual components just have to be roughly brought into the starting position and then shifted against each other in a self-centering manner until the integrated connection elements—locking pins 38 and 42, and snapping elements 30—snap into the associated slots. There is no need to use screwdrivers. Thus, the stabilizer element 22 in the reactor pressure vessel 2 can be easily handled and assembled using remote handling tools under water.

LIST OF REFERENCE SIGNS

2 Reactor pressure vessel
4 Core flow measurement housing tube
6 Vessel wall
8 Holding element
10 Pipe
12 Pipe
14 Plug-in connector area
16 Radial gap
18 Stage
20 Insertion funnel
22 Stabilizer element
24 Clamping ring
26 Attachment
28 Jacket
30 Snapping element
34 Half shell
36 Front face
38 Locking pin
40 Recess
42 Locking pin
44 Half shell
46 Base body
48 Tensioner
52 Ring groove
54 Shoulder
56 Latch recess
60 Nuclear power plant
80 Upper part
82 Lower part
84 Middle part

What is claimed is:

1. A stabilizer element for a pipe connection, in which a first pipe is inserted into a second pipe that has an insertion funnel, the stabilizer element comprising:
   a clamping ring with at least two tensioners distributed around a circumference of the clamping ring, the tensioners, in a final assembly position, arranged and configured for engaging in an intermediate space between the first pipe and the insertion funnel and configured for contacting an outer circumferential surface of the first pipe and an inner circumferential surface of the insertion funnel to tension the first pipe and the second pipe against one another, the clamping ring being composed of at least two mutually connectable ring segments,
   wherein the clamping ring includes spring-loaded locking pins locking adjacent ring segments among the ring segments of the clamping ring.

2. The stabilizer element according to claim 1, wherein adjacent ring segments among the ring segments of the clamping ring have mutually complementary projections and/or recesses on connecting surfaces to enable self-centering assembly of the clamping ring.

3. The stabilizer element according to claim 1, wherein the clamping ring has at least two snapping elements distributed over the circumference of the clamping ring, the snapping elements configured for engaging in associated snap notches in the insertion funnel in the final assembly position.

4. The stabilizer element according to claim 1, further comprising a circular attachment that is configured for, in the final assembly position, being supported against the second pipe and the insertion funnel, and for at least partly overlapping the clamping ring, wherein the circular attachment is composed of at least two mutually connectable ring segments.

5. The stabilizer element according to claim 4, wherein adjacent ring segments among the ring segments of the circular attachment have mutually complementary projections and recesses on connecting surfaces to enable self-centering assembly of the circular attachment.

6. The stabilizer element according to claim 4, wherein the circular attachment includes spring-loaded locking pins configured for locking adjacent ring segments among the ring segments of the circular attachment.

7. The stabilizer element according to claim 4, wherein the clamping ring has at least two snapping elements distributed over the circumference of the clamping ring, configured for engaging in associated snap notches in the circular attachment at the final assembly position.

8. The stabilizer element according to claim 7, wherein the snap notches are configured as a circumferential ring groove in the circular attachment.

9. The stabilizer element according to claim 7, wherein the snapping elements are flexure bearings.

10. The stabilizer element according to claim 4, wherein the at least two mutually connectable ring segments of the circular attachment are two half shells.

11. The stabilizer element according to claim 1, wherein the tensioners are each wedge-shaped or each have a wedge-shaped upper part.

12. The stabilizer element according to claim 1, wherein the at least two mutually connectable ring segments of the clamping ring are two half shells.

13. An assembly comprising:
a pipe connection wherein a first pipe is inserted into a second pipe at a connection area, the second pipe having an insertion funnel; and
the stabilizer element according to claim 1 stabilizing the connection area.

14. The assembly according to claim 13, wherein the first pipe and the second pipe are components of a core flow measurement housing tube for a nuclear power plant.

15. A nuclear power plant comprising:
a reactor pressure vessel;
a core flow measurement housing tube located in the reactor pressure vessel, the core flow measurement housing tube being assembled from at least two pipes that are connected to each other by the assembly according to claim 13.

16. A process for stabilizing a pipe connection wherein a first pipe is inserted into a second pipe that has an insertion funnel, the process comprising:
providing the stabilizer element according to claim 1;
placing the ring segments around the first pipe and connecting the ring segments to each other to form the clamping ring in a closed orientation; and then
shifting the clamping ring in an axial direction into a clamping seat in an interim space between the first pipe and the insertion funnel.

17. The process according to claim 16, wherein snapping elements attached to the clamping ring snap into the clamping seat in associated snap notches in the insertion funnel or in an attachment overlapping the insertion funnel, by which the clamping ring is fastened in the clamping seat.

18. A stabilizer element for a pipe connection, in which a first pipe is inserted into a second pipe that has an insertion funnel, the stabilizer element comprising:
a clamping ring with at least two tensioners distributed around a circumference of the clamping ring, the tensioners, in a final assembly position, arranged and configured for engaging in an intermediate space between the first pipe and the insertion funnel and for tensioning the first pipe and the second pipe against one another, the clamping ring being composed of at least two mutually connectable ring segments,
wherein the clamping ring includes spring-loaded locking pins locking adjacent ring segments among the ring segments of the clamping ring,
wherein the tensioners are formed as resilient prongs or lugs.

19. A stabilizer element for a pipe connection, in which a first pipe is inserted into a second pipe that has an insertion funnel, the stabilizer element comprising:
a clamping ring with at least two tensioners distributed around a circumference of the clamping ring, the tensioners, in a final assembly position, arranged and configured for gripping into an intermediate space between the first pipe and the insertion funnel and for tensioning the first pipe and the second pipe against one another, the clamping ring being composed of at least two mutually connectable ring segments,
wherein the clamping ring includes spring-loaded locking pins locking adjacent ring segments among the ring segments of the clamping ring,
the at least two tensioners each having a wedge-shape and configured for being flexible for sliding into the intermediate space between the first pipe and the insertion funnel.

\* \* \* \* \*